United States Patent
Lee et al.

(10) Patent No.: US 9,558,690 B2
(45) Date of Patent: Jan. 31, 2017

(54) ELECTRONIC DEVICE AND DISPLAY METHOD THEREOF

(71) Applicant: SAMSUNG DISPLAY CO., LTD., Yongin, Gyeonggi-Do (KR)

(72) Inventors: Seung-Rok Lee, Yongin (KR); Yoon-Jee Shin, Yongin (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 80 days.

(21) Appl. No.: 14/445,644

(22) Filed: Jul. 29, 2014

(65) Prior Publication Data

US 2015/0248210 A1 Sep. 3, 2015

(30) Foreign Application Priority Data

Feb. 28, 2014 (KR) ........................ 10-2014-0023797

(51) Int. Cl.

| G09G 5/02 | (2006.01) |
|---|---|
| G09G 5/06 | (2006.01) |
| G09G 3/20 | (2006.01) |
| G09G 3/36 | (2006.01) |
| G09G 5/39 | (2006.01) |

(Continued)

(52) U.S. Cl.
CPC ........... *G09G 3/2003* (2013.01); *G06F 1/3206* (2013.01); *G06F 1/3265* (2013.01); *G09G 3/20* (2013.01); *G09G 3/3607* (2013.01); *G09G 5/391* (2013.01); *H04N 21/42653* (2013.01); *H04N 21/4436* (2013.01); *H04N 21/44218* (2013.01); *G09G 2300/0452* (2013.01); *G09G 2320/066* (2013.01); *G09G 2320/0666* (2013.01);

(Continued)

(58) Field of Classification Search
CPC combination set(s) only.
See application file for complete search history.

(56) References Cited

U.S. PATENT DOCUMENTS 5,543,819 A * 8/1996 Farwell ............... G02F 1/13473
                                                                  345/694
2002/0018600 A1* 2/2002 Lyon ...................... H04N 3/155
                                                                  382/305

(Continued)

FOREIGN PATENT DOCUMENTS

JP      2011-258077 A    12/2011
KR   1020060133706 A    12/2006

(Continued)

*Primary Examiner* — Wesner Sajous
(74) *Attorney, Agent, or Firm* — Cantor Colburn LLP

(57) ABSTRACT

An electronic device includes a display panel including a plurality of sub-pixels, a distance sensor which senses a viewing distance between the display panel and a user, and a control unit which compares the viewing distance with a first critical distance and controls the display panel based on a result of comparison between the viewing distance and the first critical distance, where when the viewing distance is less than the first critical distance, the control unit controls the display panel such that all of the sub-pixels are activated and the display panel displays an image at a basic resolution, and when the viewing distance is greater than the first critical distance, the control unit controls the display panel such that a first number of sub-pixels are inactivated and the display panel displays an image at a first resolution lower than the basic resolution.

20 Claims, 15 Drawing Sheets

(51) Int. Cl.
*G06F 1/32* (2006.01)
*H04N 21/426* (2011.01)
*H04N 21/442* (2011.01)
*H04N 21/443* (2011.01)
*G09G 5/391* (2006.01)

(52) U.S. Cl.
CPC ............... *G09G 2340/0407* (2013.01); *G09G 2340/0457* (2013.01)

(56) References Cited

U.S. PATENT DOCUMENTS

| | | | |
|---|---|---|---|
| 2011/0051239 A1* | 3/2011 | Daiku | G02B 27/0093 359/464 |
| 2012/0013745 A1 | 1/2012 | Kang et al. | |
| 2013/0176345 A1 | 7/2013 | Kim et al. | |
| 2014/0118354 A1* | 5/2014 | Pais | G09G 5/373 345/428 |
| 2014/0320614 A1* | 10/2014 | Gaudreau | G02B 27/2214 348/51 |
| 2014/0354351 A1* | 12/2014 | Kawle | G05F 3/262 327/581 |
| 2015/0213786 A1* | 7/2015 | Mamajiwala | G09G 5/391 345/428 |

FOREIGN PATENT DOCUMENTS

| | | |
|---|---|---|
| KR | 10-2013-0081458 A | 7/2013 |
| WO | 2011059127 A1 | 5/2011 |

* cited by examiner

FIG. 2
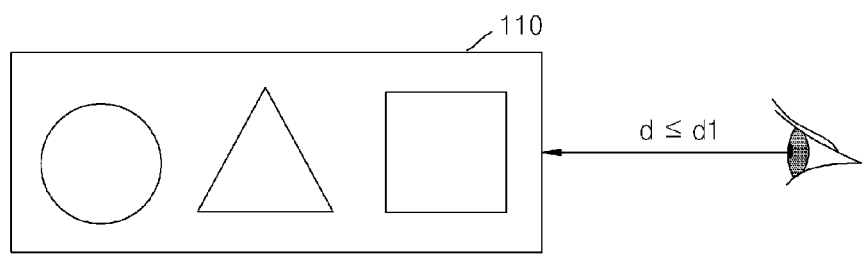
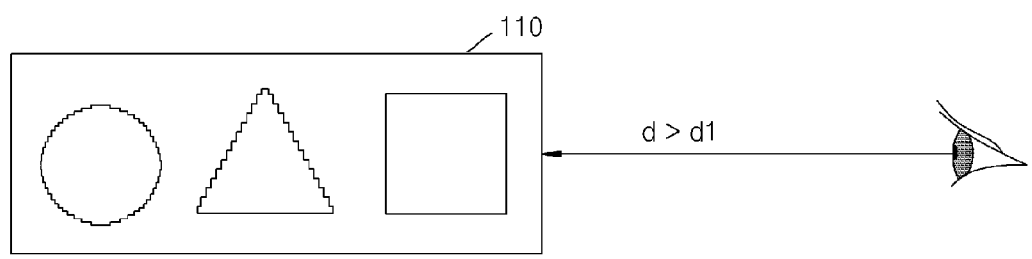

ELECTRONIC DEVICE AND DISPLAY METHOD THEREOF

This application claims priority to Korean Patent Application No. 10-2014-0023797, filed on Feb. 28, 2014, and all the benefits accruing therefrom under 35 U.S.C. §119, the content of which in its entirety is herein incorporated by reference.

BACKGROUND

1. Field

Exemplary embodiments of the invention relate to an electronic device including a display panel and a display method thereof.

2. Description of the Related Art

A portable electronic device, such as a smartphone or a tablet computer, typically includes a display device. In recent, not only the size but also image quality of such a display device for maximizing realism and the concentration of a user when using the display device such as a resolution or color representation of the display device, are regarded as important factors for evaluation of display technology.

For televisions ("TV"s), ultra high definition ("UHD") (3840×2160 pixels) exceeding full high definition ("FHD") (1920×1080 pixels) has been introduced, and for smartphones, FHD exceeding wide video graphics array ("WVGA") (800×480 pixels) is commonly used and the commercialization of smartphones having a quad high definition screen ("QHD") (2560×1440 pixels) is also near. In addition, tables computers having a wide quad extended graphics array ("WQXGA") (2560×1600 pixels) screen have been developed. Also, pixels per inch ("PPI"), indicating a pixel density of a display, has now exceeded 300 and reached up to 500 or more, and thus the competition for high image quality displays has accelerated.

SUMMARY

One or more exemplary embodiments of the invention include a display panel, a display apparatus that has a resolution that varies based on a distance between a user and a display panel thereof, an electronic device including the display apparatus, and a display method thereof.

According to one or more exemplary embodiments of the invention, an electronic device includes: a display panel including a plurality of sub-pixels; a distance sensor which senses a viewing distance between the display panel and a user; and a control unit which compares the viewing distance with a first critical distance and controls the display panel based on a result of comparison between the viewing distance and the first critical distance, where when the viewing distance is less than the first critical distance, the control unit controls the display panel such that all of the sub-pixels are activated and the display panel displays at a basic resolution, and when the viewing distance is greater than the first critical distance, the control unit controls the display panel such that a first number of sub-pixels are inactivated and the display panel displays at a first resolution lower than the basic resolution.

In an exemplary embodiment, the control unit may compare the viewing distance with a second critical distance, and when the viewing distance is greater than the first critical distance and is less than the second critical distance, the control unit may control the display panel such that the display panel displays at the first resolution, and when the viewing distance is greater than the second distance, the control unit may control the display panel such that more sub-pixels than the first number of sub-pixels are inactivated and the display panel displays at a second resolution lower than the first resolution.

In an exemplary embodiment, the second critical distance may be twice the first critical distance.

In an exemplary embodiment, the number of the sub-pixels inactivated when the display panel displays at the second resolution may be twice the number of the sub-pixels inactivated when the display panel displays at the first resolution.

In an exemplary embodiment, the sub-pixels may be grouped into a plurality of sub-pixel groups, where the sub-pixels in each sub-pixel group are disposed adjacent to each other, and the sub-pixel groups may be sequentially inactivated based on a predetermined sequential order.

In an exemplary embodiment, when the viewing distance becomes greater than the first critical distance, the control unit may control the display panel such that sub-pixels of a sub-pixel group at a second time interval, adjacent to the sub-pixel group inactivated during a first time interval pervious to the second time interval based on the predetermined sequential order, are inactivated and the display panel displays at the first resolution.

In an exemplary embodiment, the display panel may include a plurality of pixels arranged substantially in a matrix form, where each of the pixels may include a first sub-pixel which displays a first color, a second sub-pixel which displays a second color, a third sub-pixel which displays a third color, where the first sub-pixel and the second sub-pixel are vertically disposed on a left portion in a pixel and the third sub-pixel disposed on a right side portion in the pixel.

In an exemplary embodiment, a group pixel may be defined by four adjacent pixels disposed in two rows and two columns the first number of sub-pixels may include second sub-pixels in two pixels in an upper row of the group pixel, first sub-pixels in two pixels in a lower row of the group pixel, and third sub-pixels in two pixels in a left column of the group pixel.

In an exemplary embodiment, the display panel may include a plurality of group pixels, each of which is defined by four pixels disposed in two rows and two columns, the group pixels are divided into first group pixels and second group pixels which are alternately arranged with each other in a row direction and a column direction, and the control unit controls the display panel such that every time the viewing distance becomes greater than the first critical distance, the first group pixels or the second group pixels are inactivated. In such an embodiment, when the first group pixels are inactivated, second sub-pixels in two pixels in an upper row, first sub-pixels in two pixels in a lower row, and third sub-pixels in two pixels in a left column in each of the first group pixels are inactivated, and when the second group pixels are inactivated, second sub-pixels in two pixels in an upper row, first sub-pixels in two pixels in a lower row, and third sub-pixels in two pixels in a left column in each of the second group pixels are inactivated.

In an exemplary embodiment, the display panel may include a plurality of group pixels, each of which is defined by four pixels arranged in two rows and two columns, where the group pixels are divided into first group pixels and second group pixels which are alternately arranged with each other in a row direction and a column direction, where each of the group pixels includes twelve sub-pixels divided into a first sub-pixel group and a second sub-pixel group, where the first sub-pixel group may be defined by second sub-pixels in two pixels in an upper row, first sub-pixels in two pixels in a lower row, and third sub-pixels in two pixels in a left column among the twelve sub-pixels of each of the group pixels, and the second sub-pixel group may be defined by remaining sub-pixels, except the sub-pixels in the first sub-pixel group, among the twelve sub-pixels of each of the group pixels, and where the control unit controls the display panel such that every time the viewing distance becomes greater than the first critical distance, the sub-pixels of the first sub-pixel group of the first group pixels, the sub-pixels of the first sub-pixel group of the second group pixels, the sub-pixels of the second sub-pixel group of the first group pixels, or the sub-pixels of the second sub-pixel group of the second group pixels are inactivated in a predetermined sequential order.

The control unit may compare the viewing distance with a second critical distance, and control the display panel based on a result of comparison between the viewing distance and the second critical distance such that the sub-pixels of the first sub-pixel group or the sub-pixels of the second sub-pixel group are alternately inactivated every time the viewing distance becomes greater than the second critical distance.

In an exemplary embodiment, the distance sensor may include an ultrasonic sensor or an infrared sensor.

According to one or more exemplary embodiments of the invention, an electronic device includes: a display panel including a plurality of pixels arranged substantially in a matrix form, where each of the pixels includes a plurality of sub-pixels; a distance sensor which senses a viewing distance between the display panel and a user; and a control unit which compares the viewing distance with a first critical distance and controls the display panel based on a result of comparison between the viewing distance and the first critical distance, where when the viewing distance is less than the first critical distance, the control unit controls the display panel such that all of the sub-pixels of the display panel are activated and the display panel displays an image at a basic resolution, and when the viewing distance is greater than the first critical distance, the control unit controls the display panel such that a first number of sub-pixels of the display panel are inactivated and the display panel displays an image at a first resolution lower than the basic resolution.

In an exemplary embodiment, each of the pixels may include a first sub-pixel which displays a first color, a second sub-pixel which displays a second color, and a third sub-pixel which displays a third color, where the first through third sub-pixels of each of the pixels are disposed in a same row in the display panel.

In an exemplary embodiment, the display panel may include first sub-pixels disposed in odd-numbered columns, second sub-pixels and third sub-pixels which are alternately disposed in even-numbered columns in a column direction.

In an exemplary embodiment, the display panel may include first sub-pixels disposed substantially in a matrix form, and second sub-pixels and third sub-pixels, each of which is disposed between four of the first sub-pixels disposed alternately adjacent to each other along a row direction and a column direction.

In an exemplary embodiment, the first critical distance may be preset based on a pixels per inch ("PPI") of the display panel or may be adjusted by the user based on an eyesight of the user.

According to one or more exemplary embodiments of the invention, a display method of a display panel including a plurality of sub-pixels, includes: sensing a viewing distance between the display panel and a user; comparing the viewing distance with a first critical distance; when the viewing distance is less than the first critical distance, activating all of the sub-pixels such that the display panel displays an image at a basic resolution; and when the viewing distance is greater than the first critical distance, inactivating a first number of sub-pixels such that the display panel displays an image at a first resolution lower than the basic resolution.

In an exemplary embodiment, the display method may further include: comparing the viewing distance with a second critical distance; when the viewing distance is greater than the first critical distance and less than the second critical distance, inactivating the first number of sub-pixels such that the display panel displays an image at the first resolution; and when the viewing distance is greater than the second critical distance, inactivating a second number of sub-pixels greater than the first number such that the display panel displays an image at a second resolution that is lower than the first resolution.

In an exemplary embodiment, the display method may further include, after the viewing distance changes from a distance greater than the first critical distance to a distance less than the first critical distance, when the viewing distance becomes greater than the first critical distance again, inactivating different first number of sub-pixels from the first number of sub-pixels previously inactivated, among the sub-pixels.

BRIEF DESCRIPTION OF THE DRAWINGS

These and/or other features of the invention will become apparent and more readily appreciated from the following detailed exemplary embodiments, taken in conjunction with the accompanying drawings, in which:

FIG. 2 is a schematic view illustrating a display panel of an exemplary embodiment of an electronic device displaying an image at different resolutions with respect to viewing distances, according to the invention;

FIG. 7 illustrates the arrangement of sub-pixels of a display panel of an alternative exemplary embodiment of an electronic device according to the invention;

DETAILED DESCRIPTION

Figure 1:
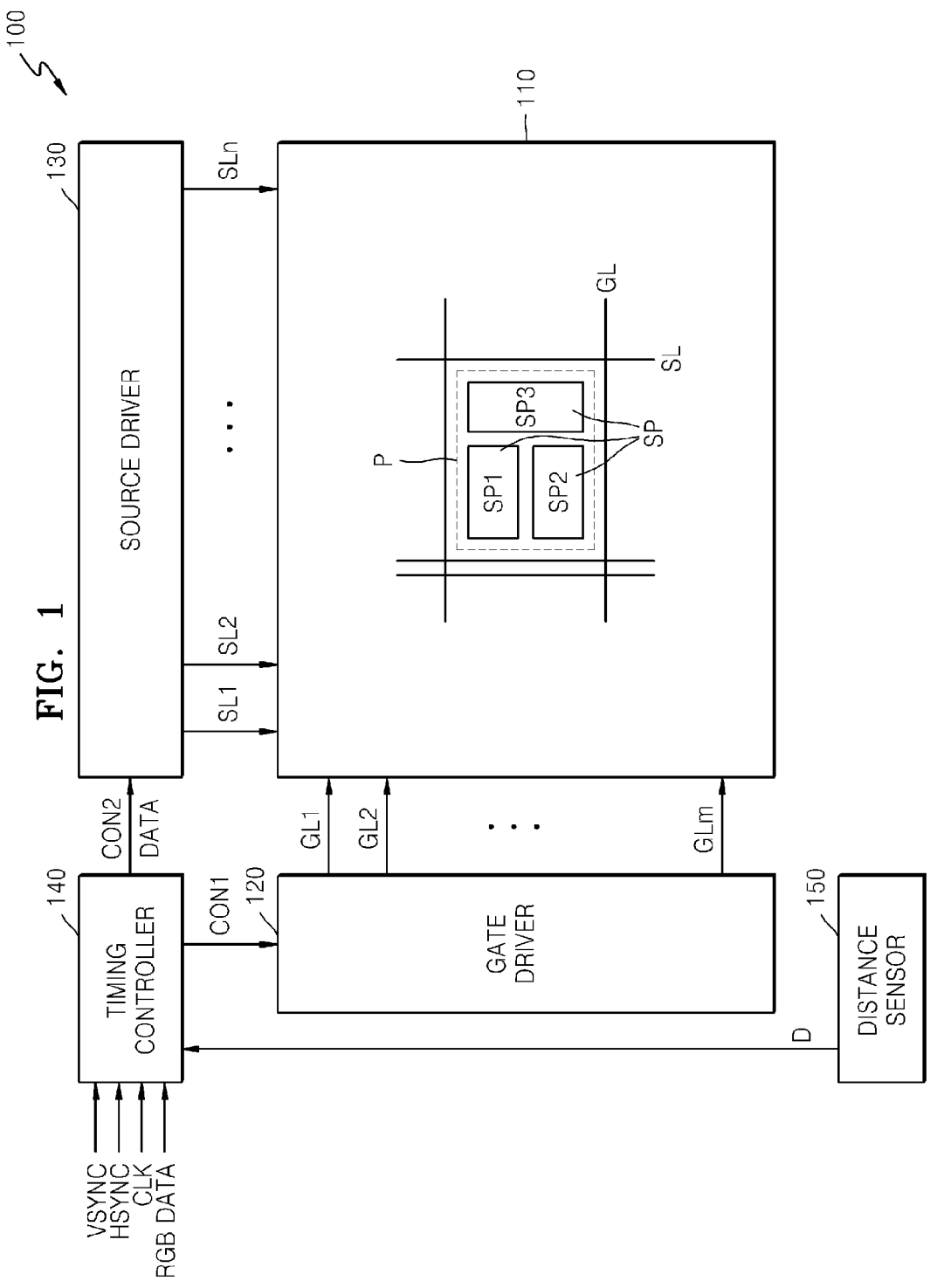
FIG. 1 is a block diagram of an exemplary embodiment of an electronic device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of a liquid crystal display according to the invention will be described in detail with reference to the accompanying drawings.

FIG. 1 is a block diagram of an exemplary embodiment of an electronic device 100 according to the invention.

Referring to FIG. 1, an exemplary embodiment of the electronic device 100 includes a display panel 110, a gate driver 120, a source driver 130, a timing controller 140 and a distance sensor 150. The gate driver 120, the source driver 130 and the timing controller 140 may be collectively referred to as a control unit configured to control the display panel 110. The display panel 110 includes a plurality of sub-pixels SP. The distance sensor 150 senses a viewing distance between the display panel 110 and a user. The control unit compares the viewing distance with a preset first critical distance. In an exemplary embodiment, when the viewing distance is less than the first critical distance, the control unit controls the display panel 110 to activate all sub-pixels SP and the display panel 110 thereby displays an image at a basic resolution. In such an embodiment, when the viewing distance is greater than the first critical distance, the control unit controls the display panel 110 to inactivate some of the sub-pixels, e.g., a predetermined number of sub-pixels or a first number of sub-pixels) SP and the display panel 110 thereby displays an image at a first resolution that is lower than the basic resolution. Here, the first number is less than the entire number of the sub-pixels. In one exemplary embodiment, for example, the first number may be a half of the entire number.

The electronic device 100 includes an apparatus that includes the display panel 110 to display an image, such as a smartphone, a tablet computer, a laptop computer, a monitor, or a television ("TV"). In an exemplary embodiment, the electronic device 100 includes a processor to perform particular functions of the electronic device 100, and the processor may be referred to as a control unit. In one exemplary embodiment, for example, where the electronic device 100 is a smartphone, the electronic device 100 includes a processor for wireless communication, a computing processor and a graphics processor. In one exemplary embodiment, for example, where the electronic device 100 is a tablet computer or a laptop computer, the electronic device 100 includes a computing processor or a graphics processor. In such an embodiment, the computing processor and the graphics processor may be integrated into a single processor.

The display panel 110 may be a flat panel display panel, such as an organic light-emitting diode ("OLED") display panel or a liquid crystal display ("LCD") panel, for example, but the invention is not limited thereto. Hereinafter, for convenience of description, an exemplary embodiment where the display panel 110 is an OLED display panel will be described in detail.

The display panel 110 includes a plurality of sub-pixels SP arranged substantially in a matrix form. A pixel P may include a predetermined number of sub-pixels SP, e.g., two or three sub-pixels. In an exemplary embodiment, as illustrated in FIG. 1 a pixel P may include three sub-pixels, for example, a first sub-pixel SP1, a second sub-pixel SP2 and a third sub-pixel SP3. The first sub-pixel SP1 may display a first color (e.g., red), the second sub-pixel SP2 may display a second color (e.g., green), and the third sub-pixel SP3 may display a third color (e.g., blue).

In the display panel 110, a plurality of gate lines GL extending substantially in a first direction (e.g., a row direction) and a plurality of source lines SL extending substantially in a second direction (e.g., a column direction) are arranged. The gate lines GL and the source lines SL are electrically connected to the sub-pixels SP.

In response to a scanning signal transmitted through the gate lines GL, a data signal transmitted through the source lines SL may be input to the sub-pixels SP, and the sub-pixels SP may emit light of a luminance corresponding to the data signal. In one exemplary embodiment, for example, the sub-pixels SP may each include an organic emission layer interposed between a pixel electrode and an opposing electrode, and a current corresponding to the data signal may be applied to the organic emission layer to emit light of a luminance corresponding to the data signal.

The timing controller 140 may control the gate driver 120 and the source driver 130. The timing controller 140 may receive a vertical synchronization signal VSYNC, a horizontal synchronization signal HSYNC, a clock CLK and image data (e.g., RGB data) RGB DATA for an input frame, and may generate a plurality of control signals including a first control signal CON1 and a second control signal CON2.

In one exemplary embodiment, for example, the timing controller 140 may generate a first control signal CON1, a second control signal CON2 and digital image data DATA based on the horizontal synchronization signal HSYNC, the vertical synchronization signal VSYNC, a clock CLK and the image data RGB DATA.

The gate driver 120 may sequentially drive gate lines GL1 through GLm based on the first control signal CON1. In one exemplary embodiment, for example, the first control signal CON1 may be a command signal that directs the gate driver 120 to start a scanning of the gate lines GL1 through GLm. The gate driver 120 may generate a scanning signal, and may sequentially provide the scanning signal to the sub-pixels SP through the gate lines GL1 through GLm.

The source driver 130 may drive the source lines SL1 through SLn based on the second control signal CON2 and the digital image data DATA. The source driver 130 may convert the digital image data DATA having grayscale information into data signals having a grayscale voltage corresponding to the grayscale information, and may sequentially provide the data signals to the sub-pixels SP through the source lines SL1 through SLn.

The gate driver 120, the source driver 130 and the timing controller 140 may be formed on different semiconductor chips or may be integrated into a single semiconductor chip. The gate driver 120 may be disposed on the same substrate as the display panel 110.

The distance sensor 150 may sense a distance between the display panel 110 and a user. Hereinafter, the distance between the display panel 110 and the user will be referred to as a viewing distance. The distance sensor 150 may include an ultrasonic sensor. When a transmitting unit of the ultrasonic sensor transmits ultrasound, the ultrasound is reflected by the user, and the reflected ultrasound is received by a receiving unit of the ultrasonic sensor. The ultrasonic sensor may calculate the viewing distance based on a difference between a time when ultrasound is transmitted and a time when the reflected ultrasound is received.

The distance sensor 150 may include an infrared sensor. Light emitted from a light-emitting unit of the infrared sensor may be reflected by the user, and the reflected light may be received by a light-receiving unit of the infrared sensor. The infrared sensor may calculate the viewing distance based on the amount of light received by the light-receiving unit. According to another exemplary embodiment, the infrared sensor may include two light-receiving units, and each of the light-receiving units may measure an angle at which light is reflected. The distance sensor 150 is not limited to an ultrasonic sensor or an infrared sensor, but may also be other types of sensor to sense the viewing distance.

According to an exemplary embodiment, the distance sensor 150 may provide distance information D about the viewing distance to the timing controller 140. The timing controller 140 may receive the distance information D and compare the viewing distance with a preset first critical distance. When the viewing distance is less than the first critical distance, the timing controller 140 may control the display panel 110 to activate all sub-pixels SP, and the display panel 110 thereby displays at a basic resolution. When the viewing distance is greater than the first critical distance, the timing controller 140 may control the display panel 110 to inactivate some of the sub-pixels SP, and the display panel 110 thereby displays at a first resolution that is lower than the basic resolution. When generating digital image data DATA based on the image data RGB DATA, the timing controller 140 may correct digital image data to be provided to some of the sub-pixels SP such that the some of the sub-pixels SP do not emit light. The corrected digital image data to be input to some of the sub-pixels SP may correspond to a black image, such that the some of the sub-pixels SP do not emit light.

According to another exemplary embodiment, each of the sub-pixels SP of the display panel 110 may include an enable switch. The enable switch may be interposed between a gate line and a sub-pixel SP, between a source line and a sub-pixel SP, or between a power voltage line and a sub-pixel SP. The timing controller 140 may control the gate driver 120 or the source driver 130 such that the gate driver 120 or the source driver 130 is short-circuited or opens the enable switch of the sub-pixels SP. When the viewing distance is greater than the first critical distance, the timing controller 140 may control the display panel 110 such that enable switches of some of the sub-pixels SP are opened, thereby inactivating the some of the sub-pixels SP.

According to another exemplary embodiment, the distance sensor 150 may provide distance information D to a graphics processor (not shown) of the electronic device 100, and the graphics processor may receive the distance information D and may compare the viewing distance with a preset first critical distance. When the viewing distance is less than the first critical distance, the graphics processor may control the display panel 110 such that the display panel 110 displays at a basic resolution. When the viewing distance is greater than the first critical distance, the graphics processor may inactivate some sub-pixels SP to control the display panel 110 such that the display panel 110 displays at the first resolution. The graphics processor may correct the image data RGB DATA corresponding to some sub-pixels SP to thereby inactivate them.

In an exemplary embodiment, as described above, when the viewing distance is less than the first critical distance, the display panel 110 displays at the basic resolution. However, when the user is far from the display panel 110 and the viewing distance is greater than the first critical distance, the display panel 110 may inactivate some of the sub-pixels SP or a first number of sub-pixels to display at the first resolution, which is lower than the basic resolution. The basic resolution refers to a resolution at which an image may be displayed when all sub-pixels SP of the display panel 110 are activated. In general, a size of an object that the eyes of humans may identify is limited. That is, the eyes of humans are not capable of seeing very small objects. If the user moves far from the display panel 110, each of the sub-pixels SP may not be identified by the eyes of humans. In this case, even if the display panel 110 is displayed at a lower resolution than the basic resolution, the eyes of humans are not capable of distinguishing the lowered resolution.

FIG. 2 is a schematic view illustrating the display panel 110 of an exemplary embodiment of the electronic device 100 displaying an image at different resolutions based on viewing distances, according to the invention. A distance between the eyes of a user and the display panel 110 is indicated as a viewing distance d, and a first critical distance is indicated as a first critical distance dl.

Referring to FIG. 2, in an exemplary embodiment, when a viewing distance d is less than a first critical distance dl, the display panel 110 displays a circle, a triangle and a rectangle at a high resolution. However, in such an embodiment, when the viewing distance d is greater than the first critical distance dl, the display panel 110 displays the circle, the triangle and the rectangle at a low resolution. As a result, the circle displayed on the display panel 110 may not have a smooth curved line but a rough line. However, since the user is located farther than the first critical distance dl, the user may not notice the rough line of the circle and perceive the circle to be substantially the same as the circle displayed at a high resolution. That is, when the user is farther than the first critical distance dl, the user may not distinguish an image at a high resolution (upper image) from an image displayed at a low resolution (lower image).

Compared to displaying at a low resolution, when displaying at a high resolution, the display panel 110 performs more computations and thus has to consume more current or power. However, when the user is far from the display panel 110, the user is not able to distinguish a high resolution image from a low resolution image on the display panel 110. Accordingly, in an exemplary embodiment, when the user is far from the display panel 110, the display panel 110 displays an image at a low resolution such that power consumption may be reduced.

According to an exemplary embodiment of the invention, the electronic device 100 may operate efficiently by adjusting a resolution of the display panel 110. In such an embodiment, by inactivating some sub-pixels, current consumption may be reduced by the amount of current used by the some sub-pixels. In such an embodiment, as the some sub-pixels are inactivated, a total time of light emission by the sub-pixels is reduced, and thus the lifetime of the display panel 10 may be increased. The decrease in the total luminance of the display panel 110 due to some of the inactivated sub-pixels may be offset by increasing the luminance of the other sub-pixels that are activated.

According to an exemplary embodiment, the timing controller 140 may compare the viewing distance with a preset second critical distance. When the viewing distance is greater than the first critical distance and less than the second critical distance, the timing controller 140 may control the display panel 110 such that some of sub-pixels SP or a first number of sub-pixels SP are inactivated and the display panel 110 displays at the first resolution. When the viewing distance is greater than the second critical distance, the timing controller 140 may inactivate more sub-pixels than the inactivated sub-pixels when the display panel 110 displays at the first resolution (e.g., inactivate a second number of sub-pixels, where the second number is greater than the first number) and control the display panel 110 to display at a second resolution that is lower than the first resolution.

In an exemplary embodiment, the second critical distance may be about twice the first critical distance. In such an embodiment, the number of sub-pixels SP that are inactivated when the display panel 110 displays at the second resolution may be about twice the number of sub-pixels SP that are inactivated when the display panel 110 displays at the first resolution. In one exemplary embodiment, for example, when the user is closer than the first critical distance from the display panel 110, all sub-pixels SP may be activated. When the user is farther than the first critical distance from the display panel 110 but closer than the second critical distance, about one fourth of the sub-pixels SP may be inactivated. In such an embodiment, the first resolution corresponds to about ¾ of the basic resolution. When the user is farther than the second critical distance from the display panel 110, about half of the entire sub-pixels SP may be inactivated. In such an embodiment, the second resolution corresponds to about half of the basic resolution.

According to another exemplary embodiment, the first resolution may be about half of the basic resolution, and the second resolution may be about one fourth of the basic resolution.

The first critical distance and the second critical distance may be preset, based on a size of the display panel 110 and the basic resolution, and stored in the timing controller 140. According to another exemplary embodiment, the first critical distance and the second critical distance may be preset based on the pixels per inch ("PPI") of the display panel 110. The higher the PPI of the display panel 110, the smaller the first critical distance and the second critical distance may be set. In one exemplary embodiment, for example, the first critical distance that is about twice a nominal distance, for example, about twice of a distance in a range of about 25 centimeters (cm) to about 30 cm, may be set. In one exemplary embodiment, for example, if the display panel 110 has a size of about 10 inches, the first critical distance may be set to about 50 cm and the second critical distance may be set to about 100 cm. If the display panel 110 has a size of about 5 inches, the first critical distance may be set to about 40 cm and the second critical distance may be set to about 80 cm.

According to another exemplary embodiment, the first critical distance and the second distance are variously set based on the eyesight of a user, and thus, may be adjusted by a user input. In one exemplary embodiment, for example, if the user has good eyesight, the first critical distance and the second critical distance may be set be longer, and if the user has poor eyesight, the first critical distance and the second critical distance may be set be shorter.

According to another exemplary embodiment, the timing controller 140 may store a preset third critical distance and control the display panel 110 such that the display panel 110 displays at a lower resolution than the second resolution with respect to the third critical distance.

According to another exemplary embodiment, sub-pixels SP may be grouped into a plurality of sub-pixel groups in sequential order. The sub-pixel groups may be sequentially inactivated based on a predetermined order. Accordingly, a light emission time of the sub-pixels SP may be equally reduced. In one exemplary embodiment, for example, the timing controller 140 may store sub-pixel groups that have most recently been inactivated. In such an embodiment, when the viewing distance increases to be greater than the first critical distance, the timing controller 140 controls the display panel 110 to inactivate sub-pixels SP of a sub-pixel group other than the most recently inactivated sub-pixel groups such that the display panel 110 displays at the first resolution. In one exemplary embodiment, for example, when sub-pixels of the first sub-pixel group have been inactivated most recently, and the viewing distance increases to be greater than the first critical distance thereafter, the timing controller 140 may inactivate sub-pixels SP of a second sub-pixel group.

Figure 3:
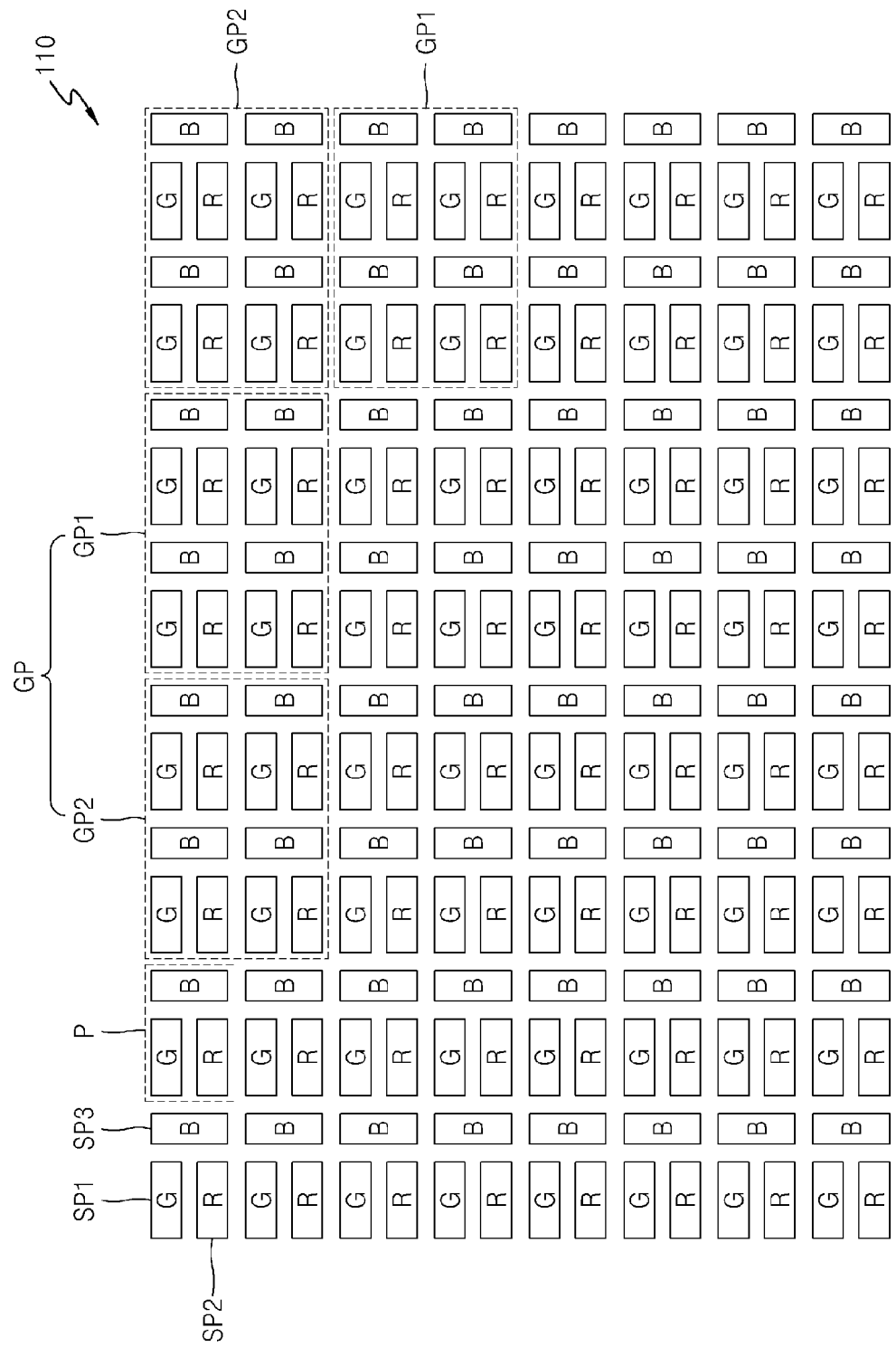
FIG. 3 illustrates the arrangement of sub-pixels of a display panel of an exemplary embodiment of an electronic device according to the invention.

FIG. 3 illustrates the arrangement of sub-pixels of the display panel 110 of an exemplary embodiment of the electronic device 100 according to the invention.

Referring to FIG. 3, the display panel 110 includes a plurality of pixels P each including a first sub-pixel SP1, a second sub-pixel SP2 and a third sub-pixel SP3. The pixels P are arranged substantially in a matrix form on the display panel 110. The first sub-pixel SP1 displays a first color (e.g., green (G)), the second sub-pixel SP2 displays a second color (e.g., red (R)), and the third sub-pixel SP3 displays a third color (e.g., blue (B)).

As illustrated in FIG. 3, the first sub-pixel SP1 and the second sub-pixel SP2 are vertically disposed on a left side portion in a pixel P. The third sub-pixel SP3 is disposed on a right side portion in the pixel P.

In one exemplary embodiment, for example, four neighboring pixels P arranged in two rows and two columns may define a group pixel GP, as shown in FIG. 3. In such an embodiment, the display panel 110 includes a plurality of group pixels GP disposed substantially in a matrix form. The group pixels GP include first group pixels GP1 and second group pixels GP2 that are alternately disposed along a row direction and a column direction. In such an embodiment, as shown in FIG. 3, two adjacent group pixels in the row direction or the column direction includes one first group pixel GP1 and one second group pixel GP2.

As illustrated in FIG. 3, when a user is located within the first critical distance from the display panel 110, all sub-pixels SP in the display panel 110 are activated. That is, all sub-pixels SP display an image corresponding to the image data DATA, at a basic resolution.

Figure 4A:
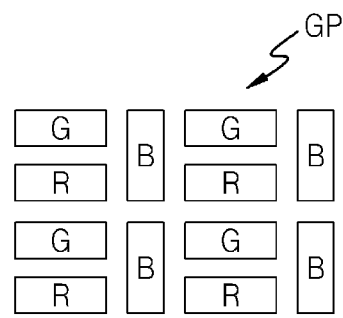
FIGS. 4A to 4C illustrate inactivation of some of sub-pixels in a group pixel based on a viewing distance in an exemplary embodiment of an electronic device according to the invention.
Figure 4B:
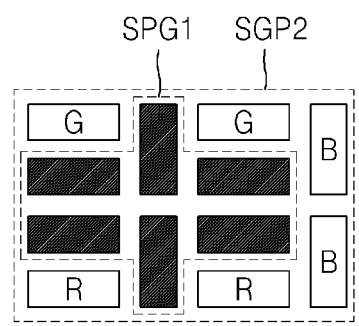
Figure 4C:
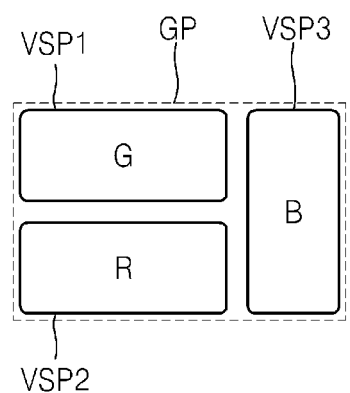

FIGS. 4A to 4C illustrate inactivation of some sub-pixels in a group pixel based on a viewing distance in an exemplary embodiment of an electronic device according to the invention.

FIG. 4A illustrates a group pixel GP in which all sub-pixels SP are activated. FIG. 4B illustrates a group pixel GP in which some sub-pixels SP are inactivated.

In one exemplary embodiment, for example, six sub-pixels SP in a pixel group GP may be inactivated when the viewing distance is greater than the first critical distance. In such an embodiment, the six sub-pixels SP that are inactivated in a group pixel GP may be referred to as a first sub-pixel group SGP1. The sub-pixels SP in a first sub-pixel group SGP1 include second sub-pixels SP2 in two pixels P in an upper row, first sub-pixels SP1 in two pixels P in a lower row, and third sub-pixels SP3 in two pixels P in a left column, in a group pixel GP.

In such an embodiment, six sub-pixels SP activated in a group pixel GP when the viewing distance is greater than the first critical distance may be referred to as a second sub-pixel group SPG2. The sub-pixels SP in the second sub-pixel group SGP2 include first sub-pixels SP1 in the two pixels P in the upper row, second sub-pixels SP2 in the two pixels P in the lower row, and third sub-pixels SP3 in two pixels P in a right column, in a group pixel GP.

When the user is positioned farther than the first critical distance from the display panel 110, the sub-pixels SP in the first sub-pixel group SGP1 may be inactivated as illustrated in FIG. 4B. In one exemplary embodiment, for example, when the user is farther than the first critical distance from the display panel 110, the second sub-pixels SP2 in the two pixels P in the upper row, the first sub-pixels SP1 in the two pixels P in the lower row, and the third sub-pixels SP3 in the two pixels P in the left column, in the group pixel GP, may be inactivated, and the display panel 110 may display an image at the first resolution.

In such an embodiment, the user may perceive three virtual sub-pixels VSP1 through VSP3 as being activated in the group pixel GP, as illustrated in FIG. 4C. The arrangement of the virtual sub-pixels VSP1 through VSP3 corresponds to the arrangement of the sub-pixels SP1 through SP3. When the arrangement of sub-pixels SP is different from the arrangement shown in FIGS. 4A to 4C, the user may sense a difference between images displayed at the basic resolution and at the first resolution based on a same image data DATA. In one exemplary embodiment, for example, the user may differently sense an image displayed via sub-pixels disposed in a stripe form and an image displayed by sub-pixels disposed in a pentile form. In an exemplary embodiment of the invention, even when predetermined sub-pixels are inactivated to reduce a resolution, the activated sub-pixels SP are arranged substantially the same as the arrangement of the sub-pixels SP1 through SP3 in each pixel, such that the user may be effectively prevented from perceiving a reduction in the resolution.

The position of the user with respect to the display panel 110 may change such that a viewing distance between the user and the display panel 110 may vary according to time. The user may be located within the first critical distance from the display panel 110 and then may be farther than the first critical distance, or may be located within the first critical distance again. The sub-pixels SP that are inactivated every time the user is farther than the first critical distance from the display panel 110 may vary.

Figure 5A:
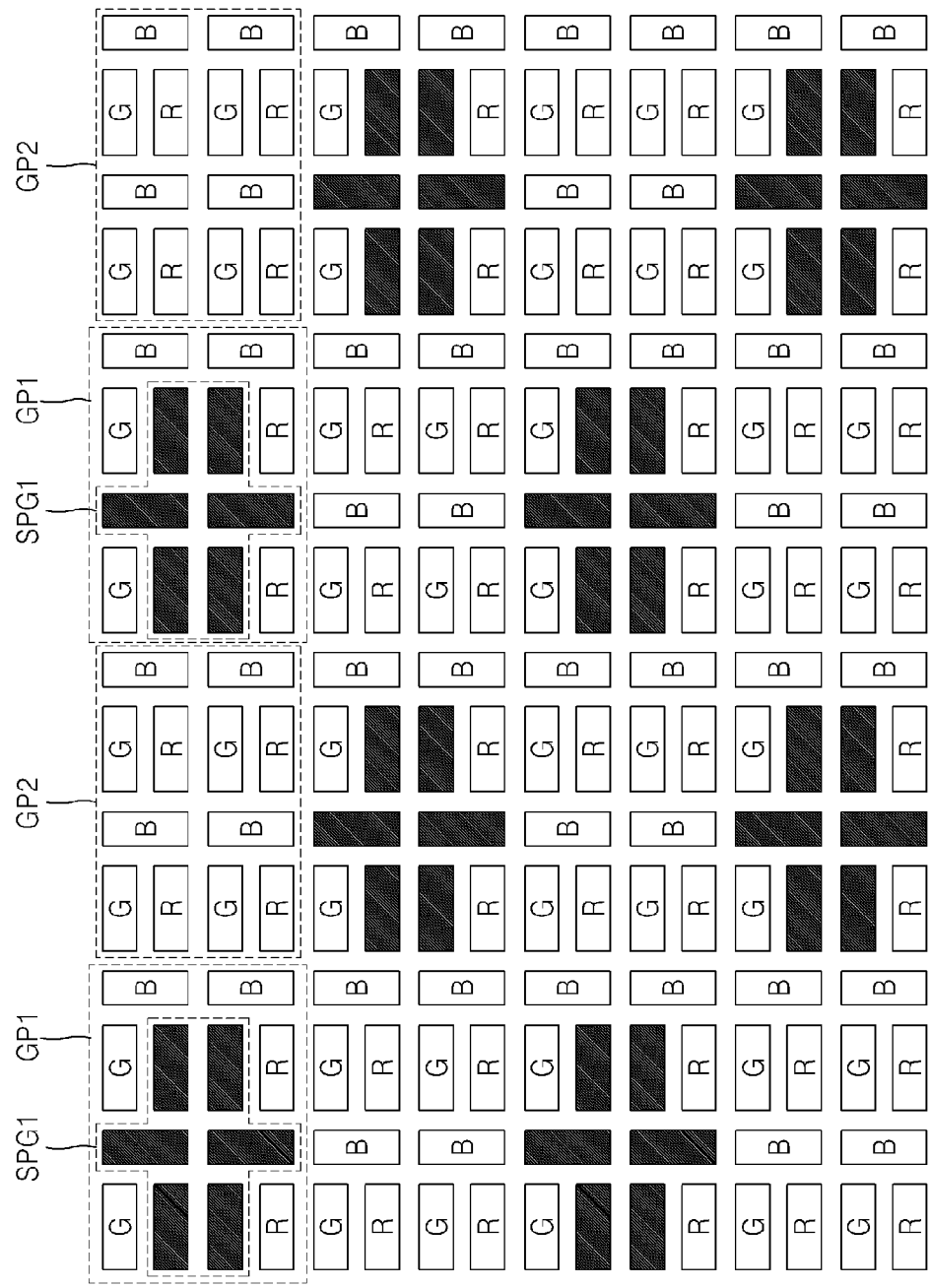
FIG. 5A illustrates a display panel in which sub-pixels in a first sub-pixel group of a first group pixel are inactivated, in an exemplary embodiment of an electronic device according to the invention.
Figure 5B:
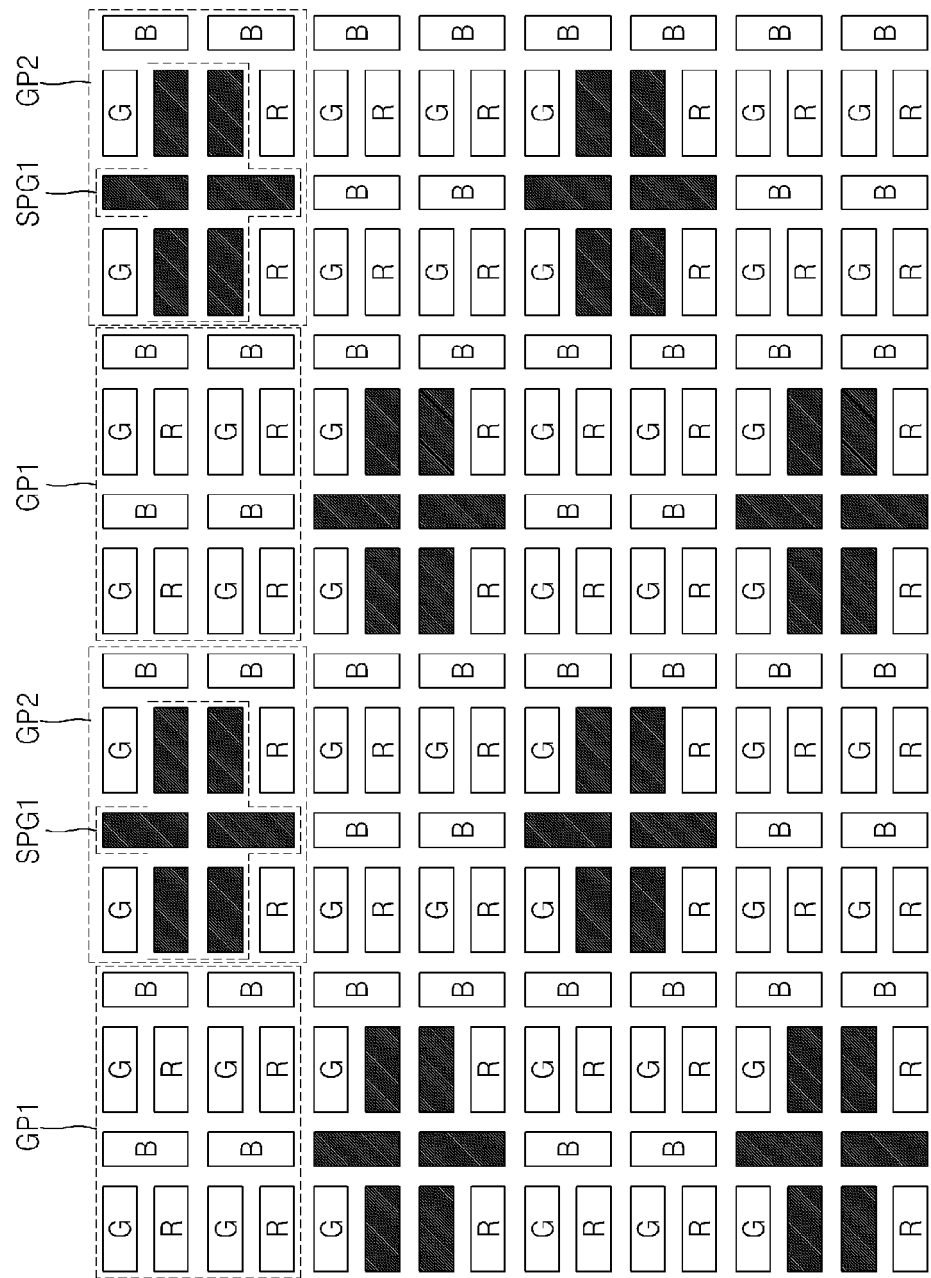
FIG. 5B illustrates a display panel in which sub-pixels in a first sub-pixel group of a second group pixel are inactivated, in an exemplary embodiment of an electronic device according to the invention.

According to an exemplary embodiment, when the user is farther than the first critical distance from the display panel 110, sub-pixels SP in a first sub-pixel group SPG1 of a first group pixels GP1 may be inactivated as illustrated in FIG. 5A. FIG. 5A illustrates an exemplary embodiment of the display panel 110 in which the sub-pixels SP in the first sub-pixel group SPG1 of the first group pixel GP1 are inactivated, in an exemplary embodiment of an electronic device according to the invention, such that the display panel 110 may display an image at a first resolution which is ¾ of a basic resolution. The sub-pixels SP in the first sub-pixel group SGP1 of the first group pixel GP1 may be inactivated until the user is closer than the first critical distance from the display panel 110. When the user is closer than the first critical distance from the display panel 110, all sub-pixels SP may be activated as illustrated in FIG. 3 such that the display panel 110 may display an image at the basic resolution. When the user is farther than the first critical distance from the display panel 110 again, the sub-pixels SP in the first sub-pixel group SPG1 of the second group pixels GP2 may be inactivated as illustrated in FIG. 5B. FIG. 5B illustrates an exemplary embodiment of the display panel 110 in which the sub-pixels SP in the first sub-pixel group SPG1 of the second group pixel GP2 are inactivated in an exemplary embodiment of an electronic device according to the invention. The display panel 110 may display an image at the first resolution. In such an embodiment, as described above, every time the user is farther than the first critical distance from the display panel 110, the sub-pixels SP in the first sub-pixel group SPG1 of the first group pixels GP1 or the sub-pixels SP in the first sub-pixel group SGP1 of the second group pixels GP2 may be alternately inactivated.

Figure 5C:
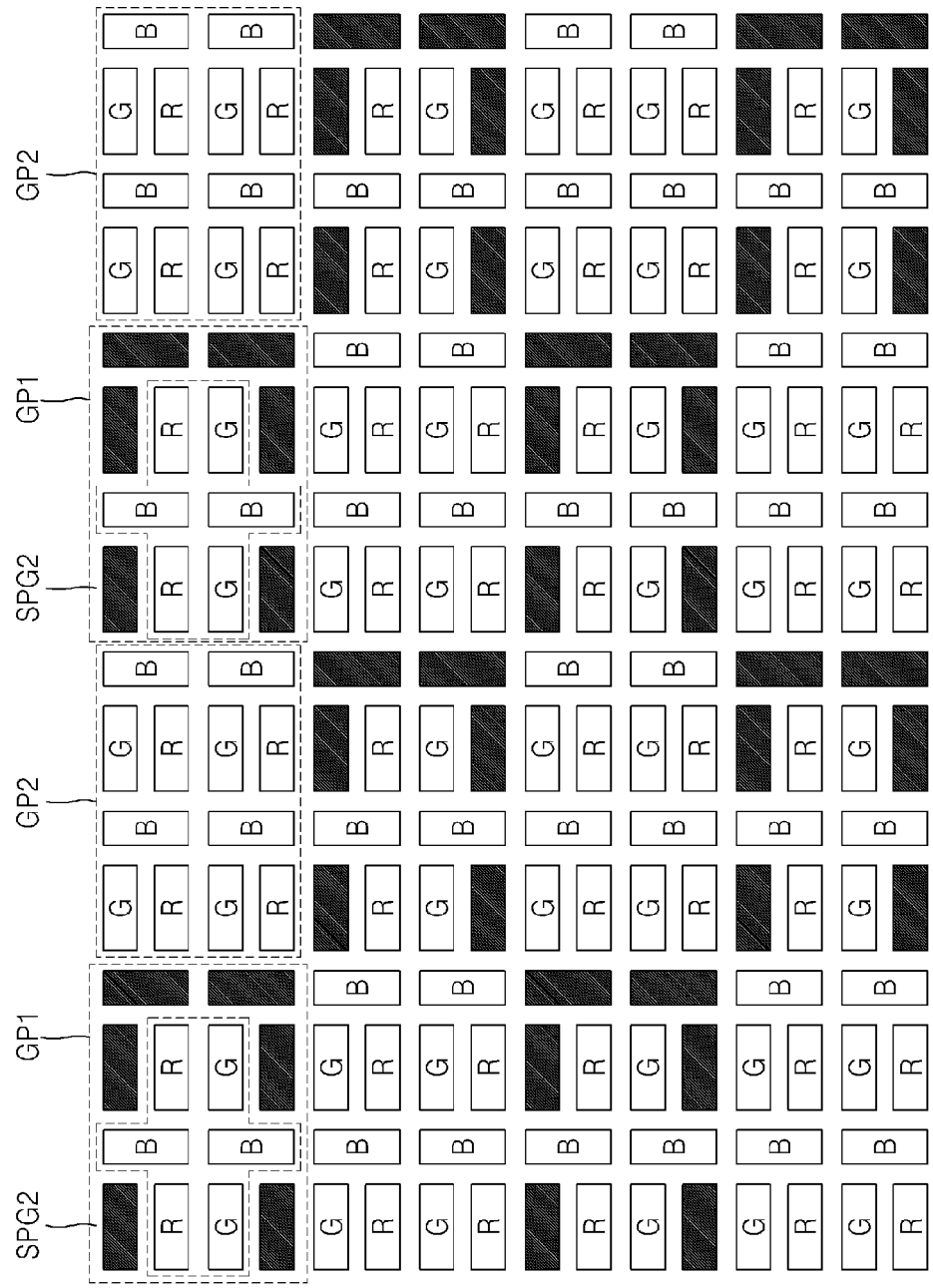
FIG. 5C illustrates a display panel in which sub-pixels in a second sub-pixel group of the first group pixel are inactivated, in an exemplary embodiment of an electronic device according to the invention.
Figure 5D:
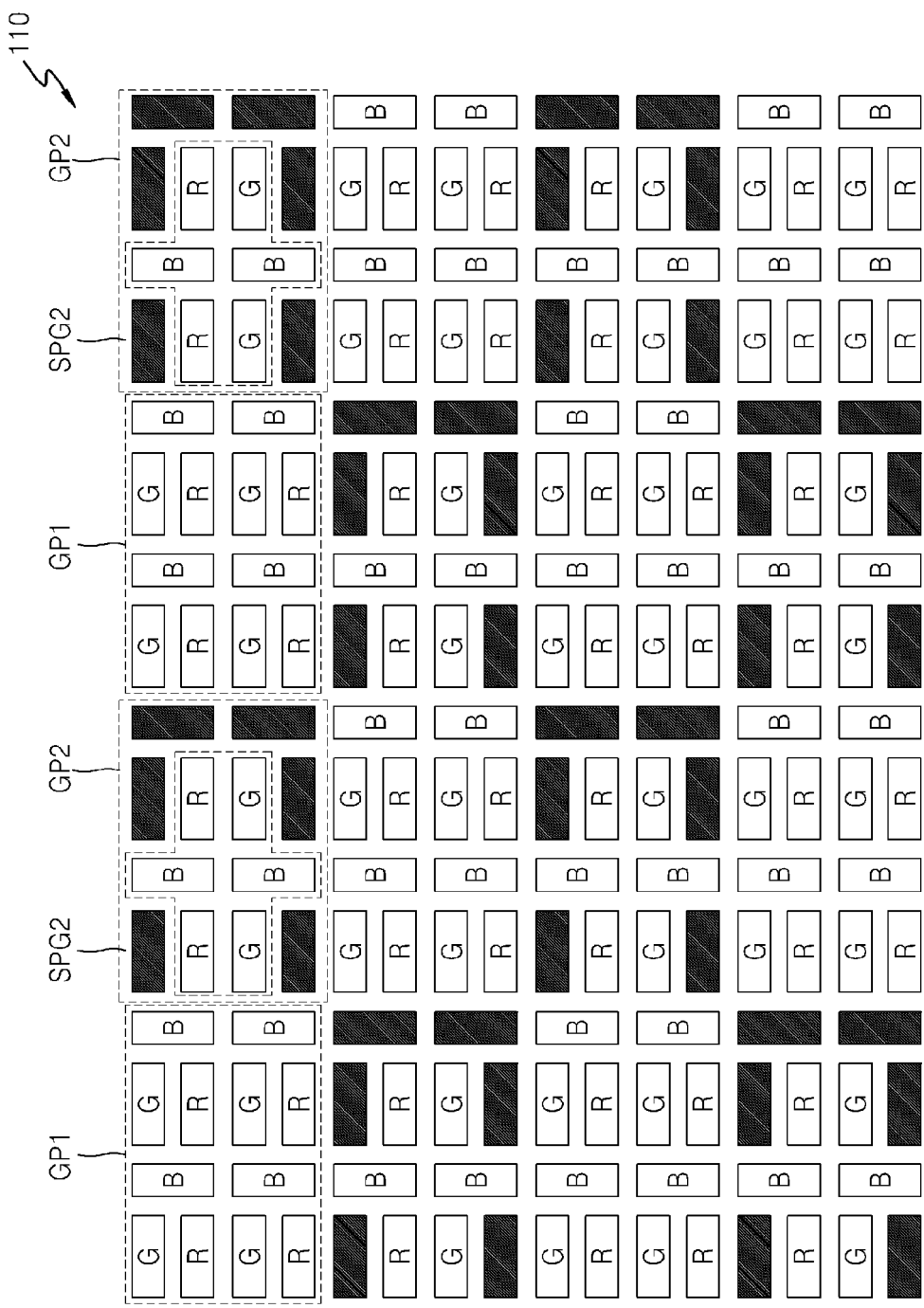
FIG. 5D illustrates a display panel in which sub-pixels in a second sub-pixel group of the second group pixel are inactivated, in an exemplary embodiment of an electronic device according to the invention.

According to another exemplary embodiment, when the user is farther than the first critical distance from the display panel 110, the sub-pixels SP in the second sub-pixel group SGP2 of the first group pixels GP1 may be inactivated as illustrated in FIG. 5C. FIG. 5C illustrates an exemplary embodiment of the display panel 110 in which the sub-pixels SP in the second sub-pixel group SGP2 of the first group pixel GP are inactivated in an exemplary embodiment of an electronic device according to the invention. Also, when the user is father than the first critical distance from the display panel 110, the sub-pixels SP in the second sub-pixel group SPG2 of the second group pixels GP2 may be inactivated as illustrated in FIG. 5D. FIG. 5D illustrates the display panel 110 in which the sub-pixels SP in the second sub-pixel group SPG2 of the second group pixel GP2 are inactivated in an exemplary embodiment of an electronic device according to the invention. In one exemplary embodiment, for example, every time the user is farther than the first critical distance from the display panel 110, the sub-pixels SP in the first sub-pixel group SPG1 of the first group pixel GP1 may be inactivated as illustrated in FIG. 5A or the sub-pixels SP in the first sub-pixel group SPG1 of the second group pixel GP2 may be inactivated as illustrated in FIG. 5B, or the sub-pixels SP in the second sub-pixel group SPG2 of the first group pixel GP1 may be inactivated as illustrated in FIG. 5C, or the sub-pixels SP in the second sub-pixel group SPG2 of the second group pixel GP2 may be inactivated as illustrated in FIG. 5D. In such an embodiment, as all sub-pixels SP in the display panel 110 are equally inactivated, the lifetime of the sub-pixels SP in the display panel 110 may be equally increased.

Figure 6A:
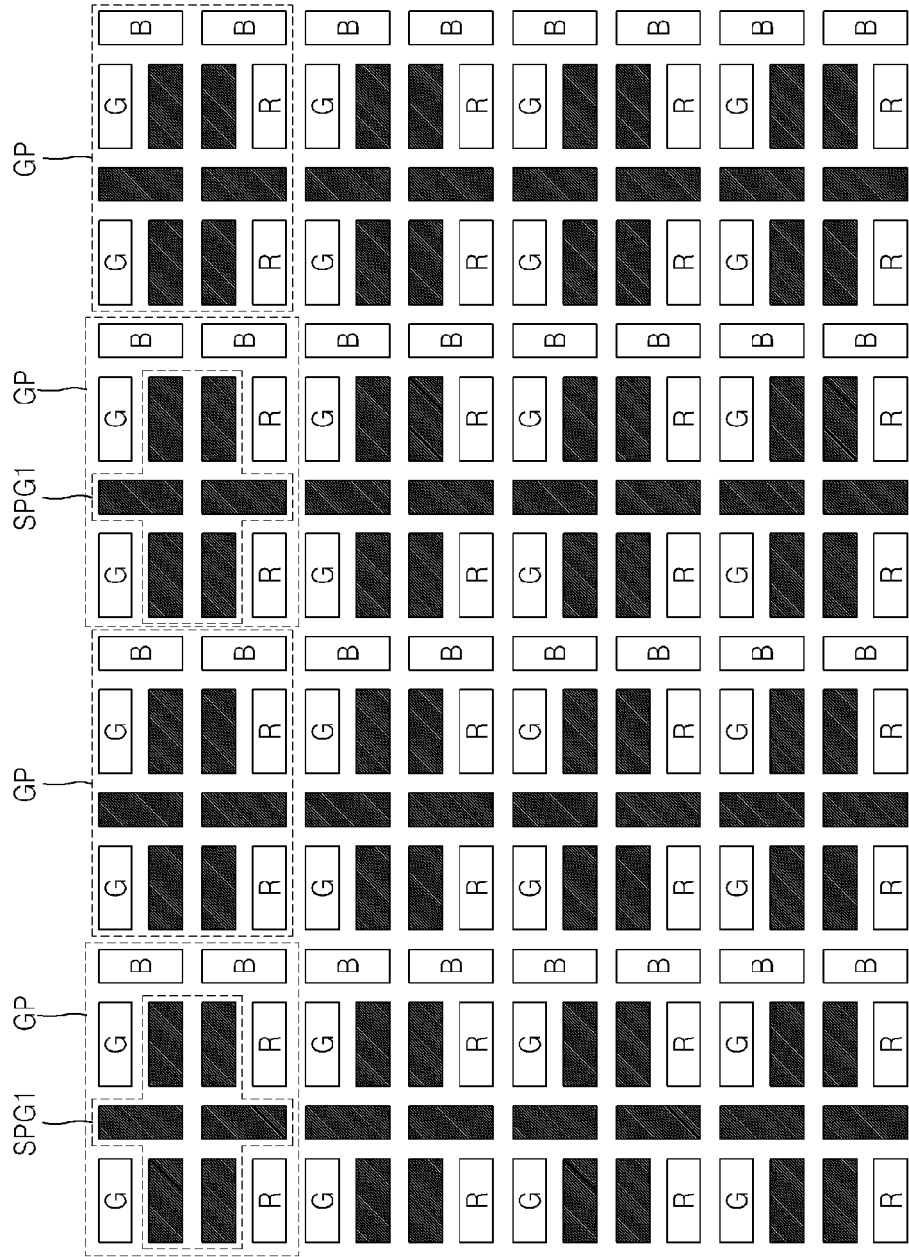
FIG. 6A illustrates a display panel in which sub-pixels in a first sub-pixel group of group pixels are inactivated, in an exemplary embodiment of an electronic device according to the invention.
Figure 6B:
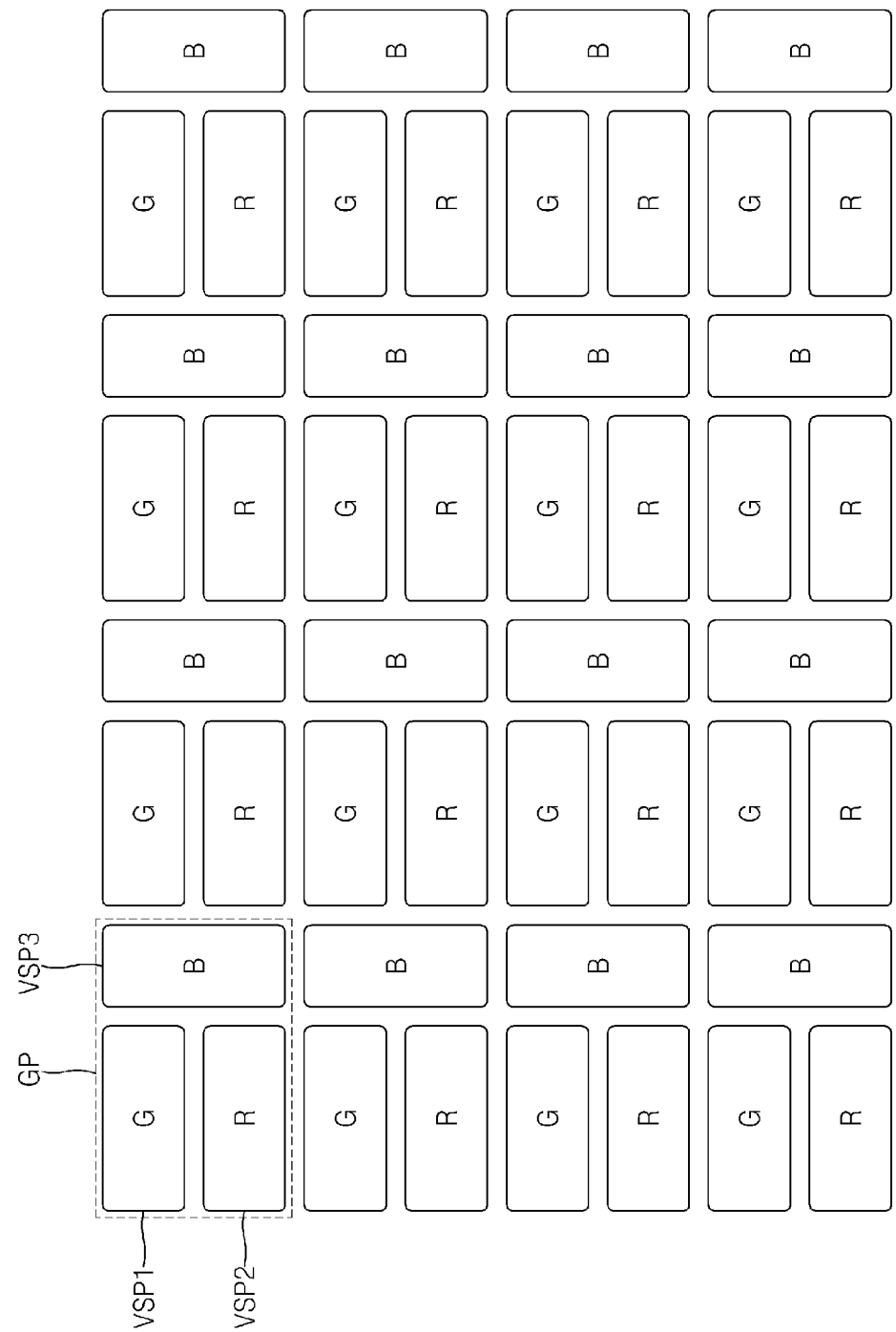
FIG. 6B illustrates a virtual display panel that is perceived when a user views the display panel of FIG. 6A at a far distance from the display panel of FIG. 6A.

According to another exemplary embodiment, when the user is farther than a preset second critical distance from the display panel 110, the sub-pixels SP in the first sub-pixel group SPG1 of the group pixels GP1 may be inactivated as illustrated in FIG. 6A. FIG. 6A illustrates the display panel 110 in which the sub-pixels SP in the first sub-pixel group SPG1 of the group pixels GP1 are inactivated in an exemplary embodiment of an electronic device according to the invention. The second critical distance may be twice the first critical distance. The display panel 110 may display an image at a resolution which is half of a basic resolution. A user who is farther than the second critical distance from the display panel 110 may perceive an image displayed on the display panel 110 illustrated in FIG. 6A as an image displayed on the display panel 110 illustrated in FIG. 6B. A virtual display panel perceived by the user who is far from the display panel 110 when the user views the display panel 110 illustrated in FIG. 6A is illustrated in FIG. 6B. The arrangement of virtual sub-pixels VSP1 through VSP3 in the group pixel GP illustrated in FIG. 6B corresponds to an extension of the arrangement of the sub-pixels SP1 through SP3 in the pixel P illustrated in FIG. 3. As the user is farther than the second critical distance from the display panel 110, the virtual sub-pixels VSP1 through VSP3 are seen substantially small. Accordingly, an image displayed by the display panel 110 illustrated in FIG. 6A, viewed by the user who is farther than the second critical distance from the display panel 110, is substantially the same as an image displayed by the display panel 110 illustrated in FIG. 3, viewed by the user who is close to the display panel 110.

Figure 6C:
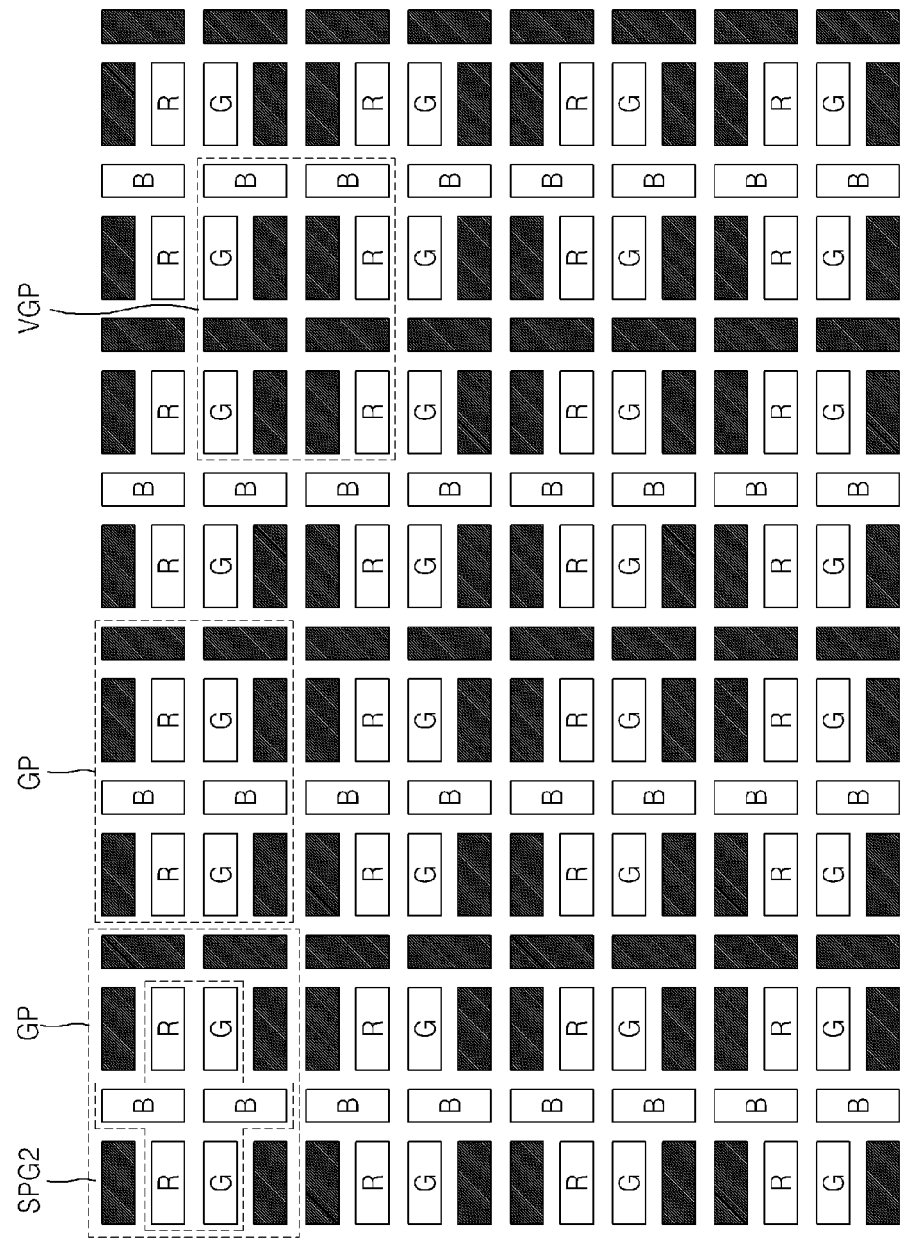
FIG. 6C illustrates a display panel in which sub-pixels in a second sub-pixel group of group pixels are inactivated, in an exemplary embodiment of an electronic device according to the invention.
Figure 6D:
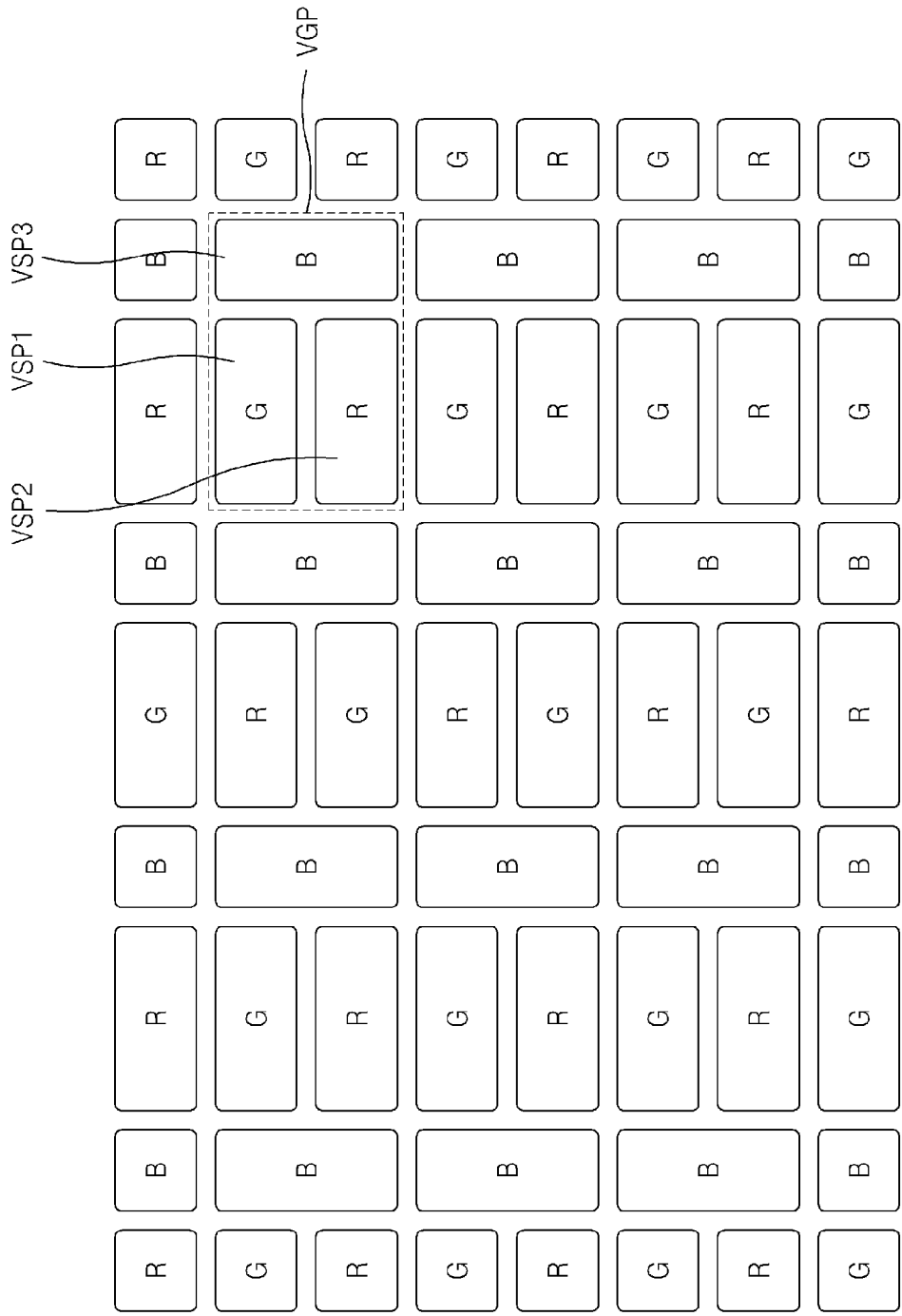
FIG. 6D illustrates a virtual display panel that is perceived when a user views the display panel of FIG. 6C at a far distance from the display panel of FIG. 6C.

After the user has been closer to the display panel 110 than the second critical distance, and then is farther than the second critical distance from the display panel 110 again, the sub-pixels SP in the second sub-pixel group SPG2 of the group pixels GP may be inactivated as illustrated in FIG. 6C. FIG. 6C illustrates a display panel in which sub-pixels in a second sub-pixel group of group pixels are inactivated in an exemplary embodiment of an electronic device according to the invention. The display panel 110 may display an image at a resolution which is half of a basic resolution. A user who is farther than the second critical distance from the display panel 110 may perceive an image displayed on the display panel 110 illustrated in FIG. 6C as an image displayed the display panel 110 illustrated in FIG. 6D. FIG. 6D illustrates a virtual display panel that is perceived when a user views the display panel 110 of FIG. 6C at a far distance from the display panel 110 of FIG. 6C. A portion of the display panel 110 illustrated in FIG. 6C, except for a boundary portion, has an arrangement corresponding to an arrangement of the sub-pixels SP1 through SP3. In one exemplary embodiment, for example, a portion indicated as a virtual group pixel VGP corresponds to a portion indicated as a virtual group pixel VGP of FIG. 6D, and the arrangement of virtual sub-pixels VSP1 through VSP3 in the virtual group pixel VGP of FIG. 6D corresponds to the arrangement of the sub-pixels SP1 through SP3 of the pixel P illustrated in FIG. 3. Accordingly, in an exemplary embodiment, even when predetermined sub-pixels are inactivated to reduce a resolution, the user may perceive some activated sub-pixels SP as being arranged according to the arrangement of the sub-pixels SP1 through SP3, such that the user is effectively prevented from perceiving a reduction in the resolution.

In such an embodiment, as described above, every time the user is farther than the second critical distance from the display panel 110, the sub-pixels SP in the first sub-pixel group SPG1 or the sub-pixels SP in the second sub-pixel group SPG2 may be alternately inactivated.

According to another exemplary embodiment, every time the user is farther than the first critical distance from the display panel 110, the sub-pixels SP in the first sub-pixel group SPG1 or the sub-pixels SP in the second sub-pixel group SPG may be alternately inactivated.

According to another exemplary embodiment, when the user is closer than the first critical distance from the display panel 110 and then is farther than the first critical distance again, among the sub-pixels SP, except the sub-pixels SP that are inactivated during a first time interval, the same number of sub-pixels SP as the sub-pixels SP that are inactivated during the first time interval may be inactivated. In one exemplary embodiment, for example, the sub-pixels SP that were inactivated during the first time interval may not be inactivated in a second time interval subsequent to the first time interval when the user is farther than the first critical distance again. Accordingly, the lifetime of the sub-pixels SP may be equally increased.

Figure 7:
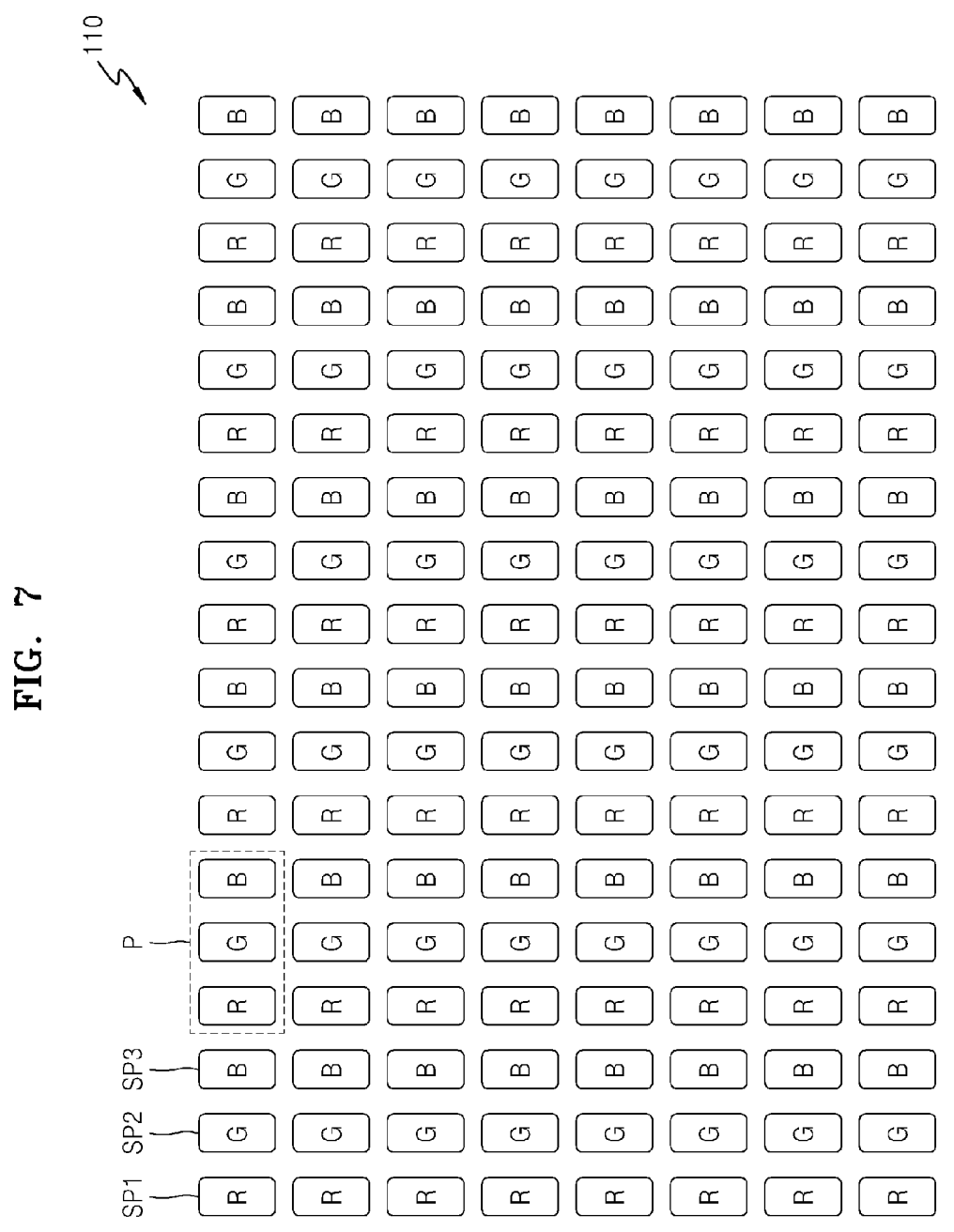

FIG. 7 illustrates an arrangement of sub-pixels of a display panel 110 of another exemplary embodiment of an electronic device according to the invention.

Referring to FIG. 7, an exemplary embodiment of the display panel 110 includes a plurality of pixels P each including a first sub-pixel SP1, a second sub-pixel SP2 and a third sub-pixel SP3. The pixels P are arranged substantially in a matrix form in the display panel 110. The first sub-pixel SP1 may display a first color (e.g., red), the second sub-pixel SP2 may display a second color (e.g., blue), and the third sub-pixel SP3 may display a third color (e.g., blue). In such an embodiment, as illustrated in FIG. 7, the first through third sub-pixels SP1, SP2 and SP3 of a same pixel P may be disposed in a same row in the display panel 110, and may be referred to as being disposed in a stripe form.

According to an exemplary embodiment, when the user is located within the first critical distance from the display panel 110, all pixels P in the display panel 110 may be activated, and the display panel 110 may display an image at a basic resolution. In such an embodiment, when the user is farther than the first critical distance from the display panel 110, some of the pixels P in the display panel 110 may be inactivated, and the display panel 110 may display an image at a first resolution lower than the basic resolution.

Figure 8:
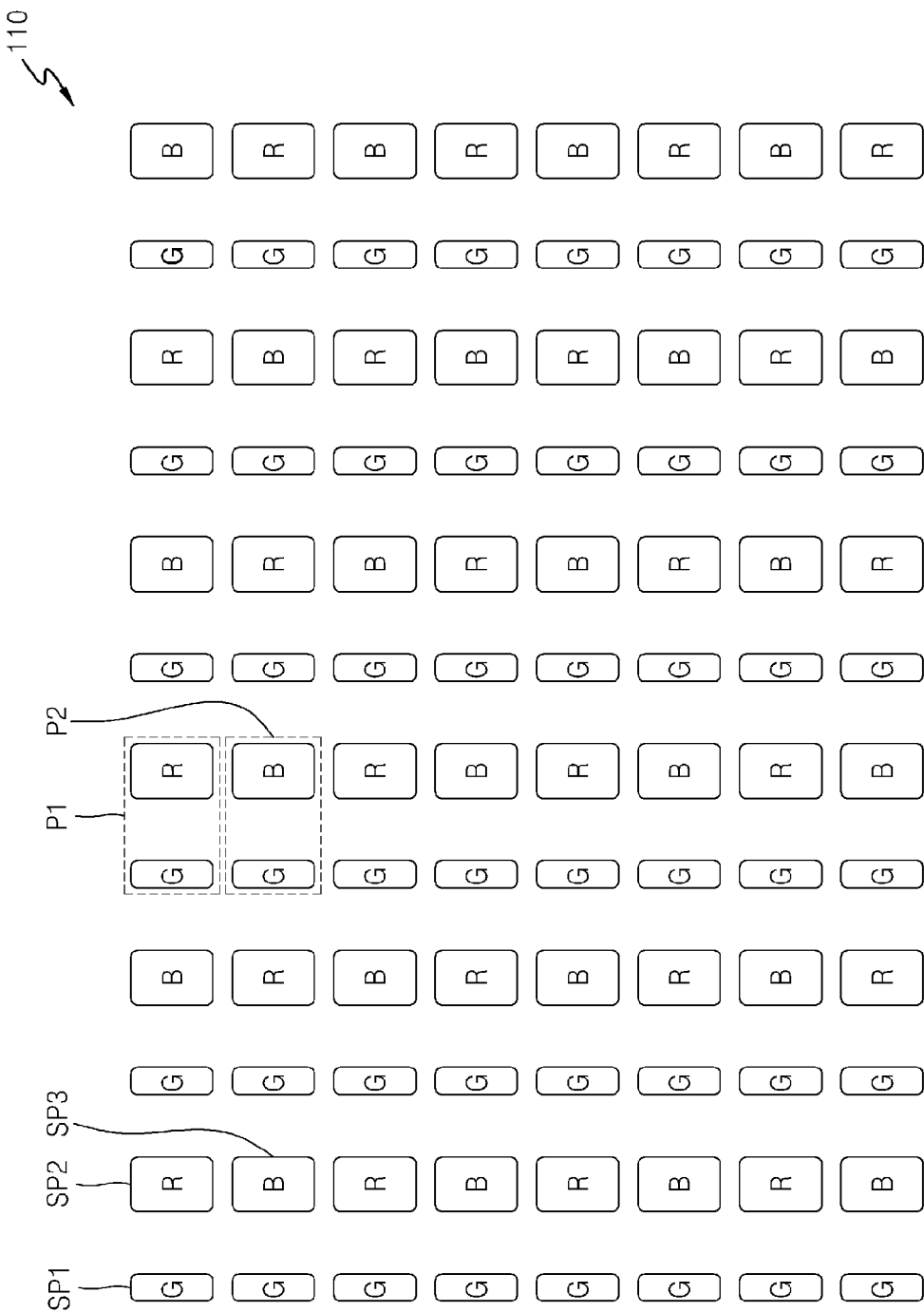
FIG. 8 illustrates the arrangement of sub-pixels of a display panel of another alternative exemplary embodiment of an electronic device according to the invention.

FIG. 8 illustrates an arrangement of sub-pixels of a display panel 110 of another exemplary embodiment of an electronic device according to the invention.

Referring to FIG. 8, an exemplary embodiment of the display panel 110 includes a plurality of first pixels P1 and a plurality of second pixels P2 that are alternately arranged with respect to each other along a row direction and a column direction. Each of the first pixels P1 includes a first sub-pixel SP1 that displays a first color (e.g., green (G)) and a second sub-pixel SP2 that displays a second color (e.g., red (R)). Each of the second pixels P2 includes a first sub-pixel SP1 that displays the first color (e.g., green (G)) and a third sub-pixel SP3 that displays a third color (e.g., blue (B)). The first sub-pixels SP1 are arranged in odd-numbered columns, and the second sub-pixels SP2 and the third sub-pixels SP3 are alternately arranged in even-numbered columns along a column direction. In such an embodiment, the first through third sub-pixels SP1, SP2, and SP3 may be referred to as being disposed in a pentile form in the display panel 110.

According to an exemplary embodiment, when the user is located within the first critical distance from the display panel 110, all of the first and second pixels P1 and P2 in the display panel 110 may be activated, and the display panel 110 may display an image at a basic resolution. When the user is farther than the first critical distance from the display panel 110, some of the first and second pixels P1 and P2 in the display panel 110 may be inactivated, and the display panel 110 may display an image at a first resolution lower than the basic resolution.

Figure 9:
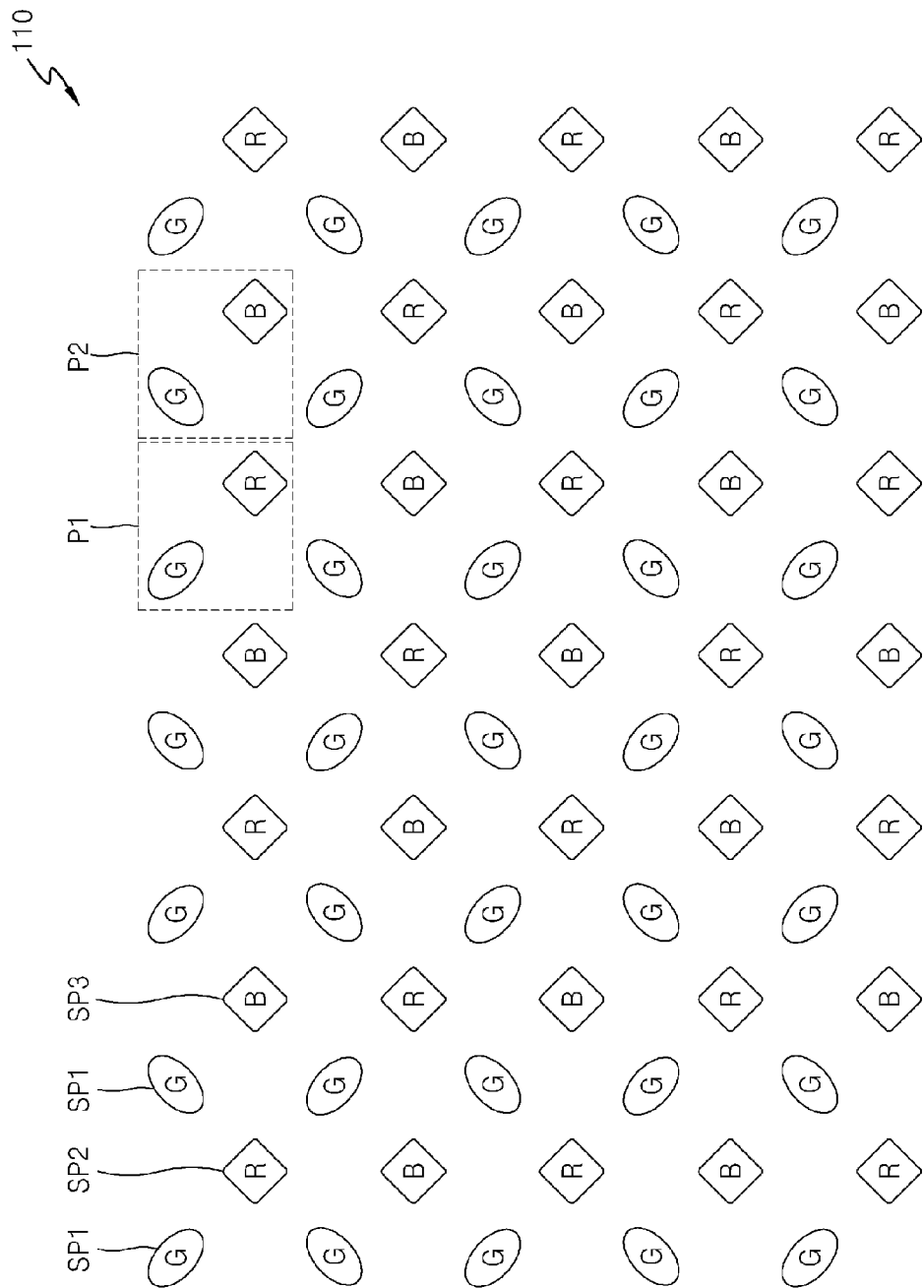
FIG. 9 illustrates the arrangement of sub-pixels of a display panel of another alternative exemplary embodiment of an electronic device according to the invention.

FIG. 9 illustrates an arrangement of sub-pixels of a display panel 110 of another exemplary embodiment of an electronic device according to the invention.

Referring to FIG. 9, an exemplary embodiment of the display panel 110 includes a plurality of first pixels P1 and a plurality of second pixels P2 that are alternately arranged with respect to each other along a row direction and a column direction. Each of the first pixels P1 includes a first sub-pixel SP1 that displays a first color (e.g., green (G)) and a second sub-pixel SP2 that displays a second color (e.g., red (R)). The second pixels P2 each include a first sub-pixel SP1 that displays the first color (e.g., green (G)) and a third sub-pixel SP3 that displays a third color (e.g., blue (B)). The first sub-pixels SP1 are arranged substantially in a matrix form in odd-numbered columns and odd-numbered rows. The second sub-pixels SP2 and the third sub-pixels SP3 are alternately arranged in even-numbered columns and even-numbered rows in a row direction and a column direction. The second sub-pixels SP2 and the third sub-pixels SP3 are disposed between four adjacent first sub-pixels SP1. In such an embodiment, the first through third sub-pixels SP1, SP2 and SP3 may be referred as being arranged in an S-pentile form in the display panel 110.

According to an exemplary embodiment, when the user is closer than the first critical distance from the display panel 110, all of the first and second pixels P1 and P2 may be activated in the display panel 110, and the display panel 110 may display an image at a basic resolution. When the user is farther than the first critical distance from the display panel 110, some of the first and second pixels P1 and P2 in the display panel 110 may be inactivated, and the display panel 110 may display an image at a first resolution that is lower than the basic resolution.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more exemplary embodiments of the invention have been described with reference to the figures, it will be understood by those of ordinary skill in the art that various changes in form and details may be made therein without departing from the spirit and scope of the invention as defined by the following claims.

What is claimed is:

1. An electronic device comprising:
   a display panel comprising a plurality of sub-pixels;
   a distance sensor which senses a viewing distance between the display panel and a user; and
   a control unit which compares the viewing distance with a first critical distance and controls the display panel based on a result of comparison between the viewing distance and the first critical distance, wherein
when the viewing distance is less than the first critical distance, the control unit controls the display panel such that all of the sub-pixels are activated and the display panel displays at a basic resolution, and
when the viewing distance is greater than the first critical distance, the control unit controls the display panel such that a first number of sub-pixels are inactivated and the display panel displays at a first resolution lower than the basic resolution.

2. The electronic device of claim 1, wherein
the control unit compares the viewing distance with a second critical distance, and
when the viewing distance is greater than the first critical distance and is less than the second critical distance, the control unit controls the display panel such that the display panel displays at the first resolution, and
when the viewing distance is greater than the second distance, the control unit controls the display panel such that a second number of sub-pixels greater than the first number are inactivated and the display panel displays at a second resolution lower than the first resolution.

3. The electronic device of claim 2, wherein the second critical distance is twice the first critical distance.

4. The electronic device of claim 2, wherein the second number of sub-pixels inactivated when the display panel displays at the second resolution is twice the first number of sub-pixels inactivated when the display panel displays at the first resolution.

5. The electronic device of claim 1, wherein
the sub-pixels are grouped into a plurality of sub-pixel groups, wherein the sub-pixels in each sub-pixel group are disposed adjacent to each other, and
the sub-pixel groups are alternately inactivated based on a predetermined sequential order.

6. The electronic device of claim 5, wherein when the viewing distance becomes greater than the first critical distance, the control unit controls the display panel such that sub-pixels of a sub-pixel group at a second time interval, adjacent to the sub-pixel group inactivated during a first time interval previous to the second time interval based on the predetermined sequential order, are inactivated and the display panel displays at the first resolution.

7. The electronic device of claim 1, wherein
the display panel comprises a plurality of pixels arranged substantially in a matrix form,
wherein each of the pixels comprises:
a first sub-pixel which displays a first color;
a second sub-pixel which displays a second color; and
a third sub-pixel which displays a third color,
wherein
the first sub-pixel and the second sub-pixel are vertically disposed on a left side portion in a pixel, and
the third sub-pixel disposed on a right side portion in the pixel.

8. The electronic device of claim 7, wherein
a group pixel is defined by four adjacent pixels disposed in two rows and two columns,
the first number of sub-pixels comprise:
second sub-pixels in two pixels in an upper row of the group pixel;
first sub-pixels in two pixels in a lower row of the group pixel; and
third sub-pixels in two pixels in a left column of the group pixel.

9. The electronic device of claim 7, wherein
the display panel comprises a plurality of group pixels, each of which is defined by four adjacent pixels disposed in two rows and two columns,
wherein the group pixels are divided into first group pixels and second group pixels which are alternately arranged with each other in a row direction and a column direction, and
wherein the control unit controls the display panel such that every time the viewing distance becomes greater than the first critical distance, the first group pixels or the second group pixels are inactivated,
when the first group pixels are inactivated, second sub-pixels in two pixels in an upper row in each of the first group pixels, first sub-pixels in two pixels in a lower row in each of the first group pixels, and third sub-pixels in two pixels in a left column in each of the first group pixels are inactivated, and
when the second group pixels are inactivated, second sub-pixels in two pixels in an upper row in each of the second group pixels, first sub-pixels in two pixels in a lower row in each of the second group pixels, and third sub-pixels in two pixels in a left column in each of the second group pixels are inactivated.

10. The electronic device of claim 7, wherein
the display panel comprises a plurality of group pixels, each of which is defined by four pixels arranged in two rows and two columns,
wherein the group pixels are divided into first group pixels and second group pixels which are alternately arranged with each other in a row direction and a column direction,
wherein each of the group pixels comprises twelve sub-pixels divided into a first sub-pixel group and a second sub-pixel group,
wherein the first sub-pixel group is defined by second sub-pixels in two pixels in an upper row, first sub-pixels in two pixels in a lower row, and third sub-pixels in two pixels in a left column, among the twelve sub-pixels of each of the group pixels, and
the second sub-pixel group is defined by remaining sub-pixels, except the sub-pixels in the first sub-pixel group, among the twelve sub-pixels of each of the group pixels, and
wherein the control unit controls the display panel such that every time the viewing distance becomes greater than the first critical distance, the sub-pixels of the first sub-pixel group of the first group pixels, the sub-pixels of the first sub-pixel group of the second group pixels, the sub-pixels of the second sub-pixel group of the first group pixels, or the sub-pixels of the second sub-pixel group of the second group pixels are inactivated in a predetermined sequential order.

11. The electronic device of claim 10, wherein
the control unit compares the viewing distance with a second critical distance, and
the control unit controls the display panel based on a result of comparison between the viewing distance and the second critical distance such that the sub-pixels of the first sub-pixel group or the sub-pixels of the second sub-pixel group are alternately inactivated every time the viewing distance becomes greater than the second critical distance.

12. The electronic device of claim 1, wherein the distance sensor comprises an ultrasonic sensor or an infrared sensor.

13. An electronic device comprising:
a display panel comprising a plurality of pixels arranged substantially in a matrix form, wherein each of the pixels comprises a plurality of sub-pixels;
a distance sensor which senses a viewing distance between the display panel and a user; and
a control unit which compares the viewing distance with a first critical distance and controls the display panel based on a result of comparison between the viewing distance and the first critical distance,
wherein
when the viewing distance is less than the first critical distance, the control unit controls the display panel such that all of the sub-pixels of the display panel are activated and the display panel displays an image at a basic resolution, and
when the viewing distance is greater than the first critical distance, the control unit controls the display panel such that a first number of sub-pixels of the display panel are inactivated and the display panel displays an image at a first resolution lower than the basic resolution.

14. The electronic device of claim 13, wherein
each of the pixels comprises:
a first sub-pixel which displays a first color;
a second sub-pixel which displays a second color; and
a third sub-pixel which displays a third color,
wherein the first through third sub-pixels of each of the pixels are disposed in a same row in the display panel.

15. The electronic device of claim 13, wherein the display panel comprises:
first sub-pixels disposed in odd-numbered columns; and
second and third sub-pixels alternately disposed in even-numbered columns in a column direction.

16. The electronic device of claim 13, wherein the display panel comprises:
first sub-pixels which are disposed substantially in a matrix form; and
second and third sub-pixels, each of which is disposed between four of the first sub-pixels disposed adjacent to each other along a row direction and a column direction.

17. The electronic device of claim 13, wherein
the first critical distance is preset based on a pixels per inch of the display panel, or
the first critical distance is adjusted by the user based on an eyesight of the user.

18. A display method of a display panel comprising a plurality of sub-pixels, the display method comprising:
sensing a viewing distance between the display panel and a user using a sensing detector;
comparing the viewing distance with a first critical distance using a control unit;
when the viewing distance is less than the first critical distance, the control unit activates all of the sub-pixels such that the display panel displays an image at a basic resolution; and
when the viewing distance is greater than the first critical distance, the control unit inactivates a first number of sub-pixels such that the display panel displays an image at a first resolution lower than the basic resolution.

19. The display method of claim 18, further comprising:
comparing the viewing distance with a second critical distance using the control unit;
when the viewing distance is greater than the first critical distance and less than the second critical distance, the control unit inactivates the first of sub-pixels such that the display panel displays an image at the first resolution; and
when the viewing distance is greater than the second critical distance, the control unit inactivates a second number of sub-pixels greater than the first number such that the display panel displays an image at a second resolution lower than the first resolution.

20. The display method of claim 18, further comprising:
after the viewing distance changes from a distance greater than the first critical distance to a distance less than the first critical distance, when the viewing distance becomes greater than the first critical distance again, the control unit inactivates a different first number of sub-pixels from the first number of sub-pixels previously inactivated, among the sub-pixels.

* * * * *